United States Patent Office 3,685,963
Patented Aug. 22, 1972

3,685,963
PROCESS FOR PREPARATION OF
FAUJASITE-TYPE ZEOLITES
Friedrich Schwochow, Leverkusen, Gerhard Heinze, Schildgen, and Horst Weber, Leverkusen, Germany, assignors to Farbenfabriken Bayer Aktiengesellschaft, Leverkusen, Germany
No Drawing. Filed Nov. 25, 1969, Ser. No. 879,913
Claims priority, application Germany, Dec. 3, 1968,
P 18 12 339.2
Int. Cl. C01b 33/28
U.S. Cl. 423—329                4 Claims

ABSTRACT OF THE DISCLOSURE

Process for the preparation of zeolites which have the crystal structure of faujasite and a composition of the formula:

$$Na_2O \cdot Al_2O_3 \cdot (3.5 \pm 0.5)SiO_2 \cdot nH_2O$$

($n=0$ to 8) by hydrothermal crystallisation of reaction mixtures which contain $Na_2O$, $Al_2O_3$, $SiO_2$ and $H_2O$ at temperatures of 20 to 120° C., characterised in that the composition of the reaction mixtures, expressed as molar ratios of the oxides, lies within the limits of $SiO_2/Al_2O_3$ 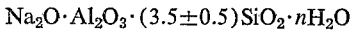 4 to 7
$Na_2O/SiO_2$ _____ 0.4 to 0.7
$H_2O/Na_2O$ _____ 30 to 50 the $SiO_2$ being used in the form of active silicic acid products with specific surfaces of the $SiO_2$ particles of between 150 and 250 m.$^2$/g. (according to BET) and the $Al_2O_3$ being in the form of sodium aluminate.

---

The invention relates to an improved process for the preparation of synthetic zeolites having a faujasite structure. Zeolites are generally understood to be a group of crystalline, hydrated aluminosilicates of monovalent or higher valent bases which give off their water without altering their crystal structure and are capable of taking up other compounds instead of the water removed and which furthermore are capable of base exchange (M. H. Hey, Trans. Ceram. Soc. 36 (1937), 84–97). In their crystal lattice, there is a rigid three-dimensional primary structure of $SiO_4$ and $AlO_4$ tetrahedra which are linked together by common oxygen atoms. Their chemical composition can therefore be represented by the following general formula:

$$R_{2/n}O \cdot Al_2O_3 \cdot xSiO_2 \cdot yH_2O$$

in which R denotes a metal of valency $n$ or H, $NH_4$, $CH_3$—$NH_3$ etc., $x$ may have a value of from 1.8 to 10 approximately and $y$ a value of from 0 to approximately 8.

The description of the chemical composition is not sufficient for defining a specific zeolite since numerous different natural and synthetic zeolite types are known which differ in their crystal structure. The X-ray diffraction spectrum is therefore an important and necessary means for defining a given zeolite type.

The fact that zeolites have found wide acceptance in chemical technology in the last 10 years as selective adsorption agents and as catalysts is due to the property of the zeolite structures of containing cavities of constant dimensions which are interconnected by regularly arranged channels. These cavities are generally occupied by water molecules. Removal of this zeolitically bound water makes the cavities free to take up other substances. Naturally, only those molecules which are smaller than the openings to these cavities can enter the lattice.

The zeolites prepared by the process according to the invention have the crystal structure of faujasite, a relatively rare mineral which was first described by Damour (Ann. d. mines (1842), 395). An exact structural analysis is given by Bergerhoff et al. (Min. Monatsk. (1958) 193.)

Synthetic faujasites, having pore diameters of about 8 to 10 A. belong to the so-called wide pored molecular sieves. In contrast to so-called narrow pored zeolites (pore diameter 3–5 A.), they will also adsorb branched and cyclic hydrocarbons and, when adsorbing smaller molecules, they are distinguished by their high speed of adsorption.

The increasing demand for wide pored zeolites, mainly in the field of catalysts, has led to the development of numerous processes for the synthesis of faujasite in most recent times. Synthetic faujasites are also described in the literature by names such as Z 14 Na, Z 14 HS, Zeolite X, Zeolite Y, Zeolite 13 X, Zeolite 10 X etc. The differences between the individual synthetic types and the natural faujasites lie mainly in the $SiO_2/Al_2O_3$ ratio.

The cubical faujasite structure enables this ratio to be varied very widely within limits of 2 to 6 corresponding to a change in the lattice constant $a0$ of from 25.00 A. to 24.60 A. without any fundamental changes in the crystal structure thereby occurring. Thus, for example, $SiO_2/Al_2O_3$ ratios of 3.0 and 3.9 correspond to lattice constants of $a0=24.87$ A., respectively $a0=24.77$ A. (German Pat. No. 1,098,929, column 4, lines 15–17). Two types of synthetic faujasite are distinguished in the literature according to their $SiO_2$ content. Synthetic zeolites which have an $SiO_2/Al_2O_3$ ratio of less than 3 are frequently termed Zeolite X and those with a ratio greater than 3 are termed Zeolite Y. In the following, the molar $SiO_2$ content based on 1 mol of $Al_2O_3$ is chosen as a characterising feature to identify the synthetic faujasites; a synthetic faujasite having an $SiO_2/Al_2O_3$ ratio of 3 is therefore termed Faujasite-3. In natural faujasite, the $SiO_2/Al_2O_3$ ratio is also not a constant factor. In fact, considerable differences in this ratio were found in minerals from different deposits. According to their nature as cationic exchangers, both natural and synthetic faujasites may contain varying quantities of different cations.

The known processes for preparing synthetic faujasites consist in a hydrothermal crystallisation of reaction mixtures which contain $Na_2O$, $Al_2O_3$, $SiO_2$ and $H_2O$. A distinction may be made between the so-called melt processes and so-called precipitation processes, according to whether the mixture which is crystallised is prepared via a melt or by precipitation. The general principle both of the melt process (see e.g. Siedler, Angew. Chem. 22 (1909), 1920) and of the precipitation process (see e.g. Kurnakow, Nachr. d. Akad. d. Wiss. d. UdSSR (1937), 1381) has in itself been known for a long time.

Due to the large number of structurally different types of zeolite, it is necessary in both processes, if the zeolites are to be prepared in the pure state, and especially for the preparation of pure faujasite, to work under narrowly defined conditions, the nature of the starting materials used, the quantitative proportions, the temperature and the reaction time being critical factors. It has been found, especially in the industrial production of synthetic faujasite, that the rate of gel precipitation, temperature during precipitation and degree of movement during precipitation or during crystallisation are important factors which decisively influence the purity of the products (see e.g. Kerr, J. phys, Chem. 72 (1968), 4, 1385–86). The influence of stirring is of special importance since production on an industrial scale can hardly be carried out without stirring owing to the uneven transmission of heat in the mixture which forms a sediment.

As described in German patent specification No. 1,138,-383 the preparation in the pure state of Zeolite X which is a synthetic faujasite of the composition $$Na_2O.Al_2O_3.2.5 \pm 0.5SiO_2.yH_2O$$

on a large scale by the precipitation process is possible only if the aluminosilicate gels which come to be crystallised have previously been subjected to ageing at a temperature range of from 10° C. to 40° C. Otherwise, the gels used are so sensitive to stirring that most of the product formed is not Zeolite X but Phillipsite which is not wanted as an industrial product. According to German Pat. No. 1,164,384, much purer products are also obtained in the synthesis of Zeolite Y, a synthetic faujasite richer in $SiO_2$ which has the composition $$Na_2O \cdot Al_2O_3 \cdot 4.5 \pm 1.5SiO_2 \cdot yH_2O$$

if the mixture of starting materials has first been digested at the temperature of the surroundings.

Another disadvantage of the known processes is that a very large excess of $SiO_2$ has to be used in the reaction mixture, which is subsequently lost with the mother liquid. Thus in Example 4 of German Pat. No. 1,098,929, Zeolite Y with $SiO_2/Al_2O_3=3.29$ is obtained from a mixture in which $SiO_2/Al_2O_3=12$, and in Example 5 Zeolite Y with $SiO_2/Al_2O_3=3.4$ is obtained from a mixture in which $SiO_2/Al_2O_3=20$.

The present invention relates to a process for the preparation of synthetic zeolites which have the crystal structure of faujasite and a composition corresponding to the general formula: $Na_2O.Al_2O_3.(3.5 \pm 0.5)SiO_2.nH_2O$ ($n=0$ to 8) by hydrothermal crystallisation of reaction mixtures which contain $Na_2O$, $Al_2O_3$, $SiO_2$ and $H_2O$ at temperatures of 20° C. to 120° C., which is characterised in that the composition of the reaction mixtures, expressed as molar ratios of the oxides, lies within the limits of $SiO_2/Al_2O_3=4$ to 7, $Na_2O/SiO_2=0.4$ to 0.7 and $H_2O/Na_2O=30$ to 50, the $SiO_2$ being used in the form of active silicic acid products with specific surfaces of the $SiO_2$ content of 40% by weight. Sols having $SiO_2$ contents BET), and the $Al_2O_3$ used being in the form of sodium aluminate.

The process according to the invention overcomes the above described disadvantages of the known processes and provides an industrially and economically especially advantageous method of preparation with high volume/time yields. It enables synthetic faujasites to be prepared from reaction mixtures with a low $SiO_2$ excess and moreover the reaction mixtures can be stirred during the crystallisation. Time consuming aging of the reaction mixture is not required. As soon as the reaction mixtures have been prepared, it can be heated with stirring to the optimum temperature for accelerating crystallisation without unwanted by-products being formed.

To carry out the process according to the invention, aqueous sodium aluminosilicate gels are prepared at the surrounding temperature i.e. at temperatures of from 15° C. to 35° C., from silica sols or from silicic acid fillers or from mixtures of the two aluminate solutions and optionally sodium hydroxide solutions and water, the total concentration of the mixtures of starting materials lying within the limits indicated above.

Silicic acid sols which have specific surfaces of the $SiO_2$ particles according to BET of 150 to 250 m.²/g. are suitable for the process according to the invention. Such silicic acid sols are advantageously prepared by ion exchange treatment of dilute waterglass solutions followed by alkaline stabilisation. They have an exceptionally low concentration of foreign bodies and are therefore astonishingly stable so that, for example, they can be concentrated by evaporation at atmospheric pressure to a $SiO_2$ content of 40% by weight. Sols having $SiO_2$ contents of 20 to 40% by weight are generally used for the process of the invention. Processes for the preparation of silicic acid sols are described e.g. in U.S. patent specifications Nos. 2,244,325 and 2,631,134 and in German patent specification No. 1,026,735.

By silicic acid fillers are meant large surfaced synthetic silicic acids which have been obtained by precipitation from an alkali metal silicate solution and which in contrast to silicic acid gels have a flocculent secondary structure. In the preparation of these silicic acid fillers, the primary particle size and hence the specific surface can be controlled within wide limits by the concentration and temperature of the solution and by the speed of precipitation, vigorousness of stirring, etc. For the process of the invention, it is suitable to use silicic acid fillers which have specific surfaces of the $SiO_2$ particles according to BET of from 150 to 200 m.²/g. Processes for the preparation of suitable silicic acid fillers are described e.g. in German patent specification No. 1,023,022.

Within the scope of the invention, the above-described silicic acid sols and silicic acid fillers which have the large specific surfaces mentioned above are considered as active silicic acid products.

Determination of the specific surface of the $SiO_2$ particles in silicic acid sols or in silicic acid fillers is carried out by the method of Brunauer, Emmet and Teller (BET) by measuring the nitrogen adsorption. The silicic acid fillers may be used directly for the measurement; aqueous silicic acid sols must first be dried at 105° C. after the addition of acid to adjust the pH to about 5.

The sodium aluminate solution is preferably prepared by dissolving aluminium oxide trihydrate (hydrogillite) in a 45% sodium hydroxide solution followed by dilution to the concentration required for the reaction mixture. Alternatively, commercial solid crystalline sodium aluminate, for example of the composition 1.25

$$Na_2O.Al_2O_3$$

may be directly dissolved in water or in a sodium hydroxide solution.

The precipitates or suspensions, after they have been rendered homogeneous at the surrounding temperature, are heated with stirring to the optimum crystallisation temperature of 75 to 100° C., preferably 80 to 90° C., and crystallised at this temperature for a time sufficient to effect crystallisation. Normally at least 4 hours are necessary, more than about 48 hours being possible but not economic. Preferably 12 to 24 hours give excellent results, with or without stirring of the reaction mixture. Lower crystallisation temperatures may also be employed but these are uneconomical because the crystallisation time then increases considerably. The crystalline paste separated from the mother liquor is washed with distilled water until the pH is 9 to 10 and then dried and optionally activated.

An additional advance of the process according to the invention over the known process lies in the fact that, in the syntheses, within the range of concentrations claimed, the $SiO_2/Al_2O_3$ ratio in the reaction products can be controlled within narrow limits. The results of the experiments represented in Table 1 show the influence of the $SiO_2/Al_2O_3$ or $Na_2O/SiO_2$ ratio in the original mixture on the $SiO_2$ content of the faujasites obtained from them. As will be described more fully in the examples, sodium aluminosilicate gels with a constant $H_2O/Na_2O$ ratio (=30) were precipitated from aqueous silica sols (30% $SiO_2$, BET 200 m.²/g.), sodium aluminate solutions, sodium hydroxide solutions and water for this purpose and crystallised under the same conditions at 85° C. in the course of 24 hours. As demonstrated by the $SiO_2/Al_2O_3$ ratios of the preparations shown in the last column of Table 1, by suitably varying the starting mixtures one can control the $SiO_2/Al_2O_3$ ratio in the preparation to obtain practically any desired value within the limits of 3 to 4, i.e. a series of faujasite-3 to faujasite-4.

TABLE 1

Dependence of the $SiO_2/Al_2O_3$ ratio in the faujasite upon the $SiO_2/Al_2O_3$ ratio in the reaction mixture (conditions: 24 hours 85° C., $H_2O/Na_2O=30$, source of $SiO_2$: silica sol, BET=200 m.²/g., 30% $SiO_2$)

| Reaction mixture | | Reaction product | |
|---|---|---|---|
| $SiO_2/Al_2O_3$ | $Na_2O/SiO_2$ | $a_0$ (A.) | $SiO_2/Al_2O_3$* |
| 4 | 0.5 | 24.829 | 3.23 |
| 4 | 0.6 | 24.837 | 3.16 |
| 5 | 0.43 | 24.767 | 3.80 |
| 5 | 0.50 | 24.818 | 3.31 |
| 5 | 0.6 | 24.828 | 3.23 |
| 5 | 0.7 | 24.863 | 2.96 |
| 6 | 0.43 | 24.736 | 4.13 |
| 6 | 0.5 | 24.789 | 3.58 |
| 6 | 0.6 | 24.817 | 3.33 |
| 6 | 0.7 | 24.863 | 2.96 |
| 7 | 0.5 | 24.775 | 3.72 |

*Calculated from the $a_0$ values of the last but one column.

Determination of the $SiO_2/Al_2O_3$ ratio in crystalline faujasites is advantageously carried out by determining the lattice constants $a_0$. The values obtained for this ratio represent the quantities of $SiO_2$ actually built into the zeolite lattice whereas in chemical analysis higher ratios are often found if in addition to crystalline zeolite some amorphous $SiO_2$ not built into the lattice is also present.

The $a_0$ values of synthetic faujasites are obtained from the equation which generally applies to cubical crystals:

$$a_0 = d \cdot \sqrt{h^2 + k^2 + l^2}$$

in which $d$ is the lattice plane distance obtained from the Debye-Scherrer diagrams and $h$, $k$ and $l$ are the corresponding Miller indices.

According to D. W. Breck and E. M. Flanigen (Synthesis and Properties of Union Carbide Zeolites L, X and Y, Paper read at the conference on Molecular Sieves, London, 4th–6th April, 1967), and $a_0$ value and the $SiO_2/Al_2O_3$ ratio are related to each other as follows:

$$a_0 = \frac{192b}{1 + (N_{Si}/N_{Al})} + c$$

($b = 0.00868$; $c = 24.191$).

In all the faujasites prepared by the process according to the invention, the $SiO_2/Al_2O_3$ ratio was calculated according to the above formula from $a_0$ values which were determined by X-ray analysis.

The experiments of Table 2 illustrate the influence of crystallisation time and crystallisation temperature. According to these results, the time required for complete crystallisation at 75° C. is about 48 hours, at 85° C. about 16 hours and at 100° C. only about 8 hours. The increase in crystallisation time beyond these minimum times causes practically no change in the preparations at a given temperature.

The influence of the crystallisation temperature on the $SiO_2$ content of the preparations is also slight. Lower temperatures however, appear to result in a slightly higher $SiO_2/Al_2O_3$ ratio than higher temperatures. On the whole, all the experiments of Table 2 illustrate the good reproducibility of the $SiO_2/Al_2O_3$ ratio in the synthesis from reaction mixtures of identical initial concentrations.

TABLE 2

Influence of crystallisation temperature and crystallisation time
[Conditions: $SiO_2$ source: silica sol (30% $SiO_2$, BET 200); sodium aluminate solution: $1.7Na_2O/Al_2O_3$; molar ratios: $SiO_2/Al_2O_3=5$, $Na_2O/SiO_2=0.5$, $H_2O/Na_2O=30$]

| Crystallisation temperature (° C.) | Crystallisation time (hours) | $H_2O$ uptake (25° C., 10 mm. Hg) (percent) | $a_0$ (A.) | $SiO_2/Al_2O_3$ (calculated from $a_0$) |
|---|---|---|---|---|
| 75 | 24 | 14.6 | (¹) | (¹) |
| 75 | 48 | 32.1 | 24.810 | 3.40 |
| 75 | 72 | 32.4 | 24.802 | 3.47 |
| 75 | 96 | 31.3 | 24.810 | 3.40 |
| 85 | 8 | 7.9 | (¹) | (¹) |
| 85 | 16 | 32.4 | 24.810 | 3.40 |
| 85 | 24 | 32.6 | 24.818 | 3.31 |
| 85 | 48 | 31.1 | 24.811 | 3.39 |
| 85 | 72 | 32.7 | 24.816 | 3.35 |
| 100 | 8 | 32.3 | 24.816 | 3.35 |
| 100 | 16 | 31.6 | 24.816 | 3.35 |
| 100 | 24 | 31.9 | 24.816 | 3.35 |
| 100 | 48 | 31.5 | 24.816 | 3.35 |

¹ Mixture of faujasite and amorphous substances.

TABLE 3

Influence of the $SiO_2$ starting material
[Conditions: $SiO_2/Al_2O_3=6$, $Na_2O/SiO_2=0.6$, $H_2O/Na_2O=30$; $Al_2O_3$ source: Na aluminate solution (1.7 $Na_2O/Al_2O_3$); crystallisation: 24 hours at 85° C.]

| Source of $SiO_2$ | $H_2O$ adsorption, percent ¹ | X-ray analysis |
|---|---|---|
| Silica gel powder ² | 1.1 | Amorphous. |
| Waterglass (0.3 $Na_2O/SiO_2$) | 2.0 | Major portion amorphous crystalline portion: faujasite. |
| ilicic acid filler, BET value 180 m²/g. | 31.9 | Pure faujasite. |
| ilicic acid sol, BET value 200 m²/g. | 32.8 | Do. |

¹ In g./100 g. (25° C., 10 mm. Hg).
² Silica gel, narrow pored, ground, 18.6% $H_2O$; suppliers: G br. Herrmann, Köln-Ehrenfeld).

Experiments with different $SiO_2$ starting materials are summarised in Table 3. They show the superiority of the sources of $SiO_2$ proposed for the process.

It is surprising that the use of a solid silicic acid filler as used e.g. in the rubber industry as a reinforcing filler provides the same advantageous results as the use of an aqueous silicic acid sol although, in the first case, a solid is reacted with an aluminate solution to form the zeolite whereas in the second case, a homogeneous gel is precipitated from soluble components and then crystallised. The use of silicic acid fillers precipitated in the wet, moreover, leads under otherwise identical conditions to slightly lower $SiO_2/Al_2O_3$ ratios than the use of aqueous silicic acid sols. Thus, for example, from a reaction mixture which has the molar ratios $SiO_2/Al_2O_3=6$, $Na_2O/SiO_2=0.6$ and $H_2O/Na_2O=40$ one obtains at 85° C. pure faujasite zeolite with a lattice constant of $a_0=24.826$ A., corresponding to an $SiO_2/Al_2O_3$ ratio of 3.25 when using a wet precipitated silicic acid filler with a BET value of 180 g./m.² whereas, when using an aqueous silicic acid sol under otherwise identical conditions, one obtains a slightly lower lattice constant of $a_0=24.810$ A. and thus a slightly higher $SiO_2/Al_2O_3$ ratio of 3.40.

The $SiO_2$ content in the crystalline product evidently depends on the specific surface of the $SiO_2$ particles in the starting material since the silicic acid filler which has a BET value of 180 m.²/g. has a slightly lower specific surface of $SiO_2$ particles than the silicic acid sol used which has a BET value of 200 m.²/g. On the other hand, the use of other $SiO_2$ sources, which is not an object of the invention, e.g. the use of uncalcined kieselguhr which has a BET value of 28 m.²/g. for the specific surface of the $SiO_2$ particles, does not lead to pure faujasite under the conditions according to the invention.

This comparison shows that, for the process according to the invention, without preliminary reaction, it is especially suitable to use those sources of $SiO_2$ in which the specific surfaces of the $SiO_2$ particles according to BET lie in the region of 150 to 250 m.²/g., regardless of whether one uses solid $SiO_2$ or $SiO_2$ in colloidal solution.

The process according to the invention is now described in greater detail with the aid of examples.

The following starting solutions were used for the experiments:

| | |
|---|---|
| Aqueous silica sol (BET 200) | 6 mol of $SiO_2$/litre. |
| Density 1.2 | 46.6 mol of $H_2O$/litre. |
| Wet precipitated silicic acid filler (BET 180). | Amorphous $SiO_2$ containing 11.6% of $H_2O$. |
| Sodium aluminate solution | 2 mols of $Al_2O_3$/litre. |
| Density 1.36 | 3.4 moles of $Na_2O$/litre; 52 mol of $H_2O$/litre. |
| Sodium hydroxide solution (45%) | 8.4 mol of $Na_2O$ litre. |
| Density 1.48 | 53.4 mol $H_2O$/litre. |

EXAMPLE 1

A solution of 100 ml. of aluminate, 19.2 ml. of sodium hydroxide solution and 30 ml. of $H_2O$ was precipitated with 167 ml. of silicic acid sol at room temperature ($SiO_2/Al_2O_3=5$; $Na_2O/SiO_2=0.5$; $H_2O/Na_2O=30$). The homogeneous gel was heated to 75° C. with stirring in about 2 hours and crystallised at this temperature for 48 hours without stirring care being taken to avoid loss of water. After cooling to room temperature, the crystalline paste was filtered off and washed with distilled water until the pH was 9. The water uptake capacity of the preparation which was activated at 500° C. was 32.1 g./100 g. (25° C., 10 mm. Hg). According to X-ray analysis, pure faujasite-3.40 with a lattice constant of $a_0=24.810$ A. corresponding to a ratio of $SiO_2/Al_2O_3=3.40$ was obtained.

EXAMPLE 2

A gel of the composition $3.6Na_2O.Al_2O_3.6SiO_2.180H_2O$ was precipitated at room temperature from 100 ml. of aluminate solution, 200 ml. of aqueous silica sol, 45.7 ml. of sodium hydroxide solution and 340 ml. of water. After homogenisation, the gel was heated to 85° C. with stirring and crystallised at this temperature in 24 hours without stirring. When the products had been washed out and activated, it showed a water uptake capacity of 32.0 g./100 g. (25° C., 10 mm. Hg) and according to X-ray analysis it was pure faujasite-3.52 with $SiO_2/Al_2O_3=3.52$ ($a_0=24.796$ A.).

EXAMPLE 3

In this example, the process was carried out in concentrated solution without the addition of water. A gel of the composition $2.58Na_2O.Al_2O_3.6SiO_2.77.5H_2O$ prepared from 100 ml. of aluminate solution, 200 ml. of silica sol and 20.5 ml. of sodium hydroxide solution was heated to 85° C. with stirring and crystallised at this temperature for 24 hours without stirring. The washed and activated product showed a water uptake capacity of 30.7 g./100 g. (25° C., 10 mm. Hg) and had a lattice constant of $a_0=24.736$ A. (corresponding to $SiO_2/Al_2O_3=4.13$), i.e. faujasite-4.13.

EXAMPLE 4

The following example shows that pure faujasite is obtained by the process according to the invention even with continuous stirring.

A gel of the composition $3.6Na_2O.Al_2O_3.6SiO_2.110H_2O$ which had been precipitated at room temperature was heated to 100° C. with stirring and crystallised at 100° C. in 8 hours with continuous stirring. After cooling to room temperature, the resulting crystalline paste was filtered off, washed with distilled water and activated at 500° C. The water uptake capacity of the preparation was 32.2 g./100 g. (25° C., 10 mm. Hg). According to X-ray analysis, pure faujasite-3.32 with $a_0=24.818$ A. or $SiO_2/Al_2O_3=3.32$ was obtained.

In the following examples, the $SiO_2$ starting material used consisted partly or entirely of a wet-precipitated silicic acid filler with BET of 180 g./m.².

EXAMPLE 5

81.4 g. of silicic acid filler were introduced with vigorous stirring at room temperature into a mixture of 100 ml. of aluminate, 45.8 ml. of sodium hydroxide solution and 380 ml. of water. The suspension of the composition $3.6Na_2O.Al_2O_3.6SiO_2.144H_2O$ was heated to 85° C. in about 2 hours with constant stirring. The crystallisation time at 85° C. was 48 hours. The preparation did not differ in purity from that prepared from a silicic acid sol. The water uptake capacity was 32.5 g./100 g. (25° C., 10 mm. Hg). X-ray analysis revealed a lattice constant of $a_0=24.826$ A. corresponding to a ratio of $SiO_2/Al_2O_3=3.25$, in other words faujasite-3.25.

EXAMPLE 6

This experiment was carried out with a silicic acid filler in a manner completely analogous to Example 5. To increase the $SiO_2$ content in the reaction product, however, a gel of the composition

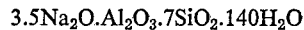

$$3.5Na_2O.Al_2O_3.7SiO_2.140H_2O$$

prepared from 100 ml. of aluminate solution, 95.2 g. of silicic acid filler, 43.4 ml. of sodium hydroxide solution and 356 ml. of water was used. The reaction product consisted of pure faujasite-3.83 with a lattice constant of $a_0=24.763$ A. (corresponding to $3.83SiO_2/Al_2O_3$) and a water uptake capacity of 31.6 g./100 g. (25° C., 10 mm. Hg).

EXAMPLE 7

In this example, a mixture of silica sol and silicic acid filler was used as a source of $SiO_2$. 40.8 g. of silicic acid filler were first introduced into 100 ml. of aluminate solution with 45.6 ml. of sodium hydroxide solution and 226 ml. of water, and 100 ml. of silica sol were then added with stirring. This mixture corresponds to a molar ratio of $SiO_2/Al_2O_3=6$; $Na_2O/SiO_2=0.6$; $H_2O/NaO=35$. The reaction mixture was heated to 85° C. with stirring and crystallised at this temperature in 48 hours. The product obtained consisted of pure faujasite-3.3 and showed a water uptake capacity of 32.3 g./100 g. (25° C., 10 mm. Hg).

EXAMPLE 8

This experiment gives an example for carrying out the process according to the invention on a larger scale. The following starting materials were used:

Sodium aluminate solution: 194.3 g. of $Al_2O_3$/litre; 196.4 g. of $Na_2O$/litre; density: 1.34

Aqueous silicic acid sol (BET 200 m.²/g.): 30% of $SiO_2$, density: 1.2

Concentrated sodium hydroxide solution: 50%, density 1.525

26.25 litres of the aluminate solution, 8.6 litres of sodium hydroxide solution and 14.5 litres of water were introduced into an electrically heatable, 150 litre vessel equipped with a stirrer and efficient heat isolation. 50 litres of the silicic acid sol were added to this solution at room temperature with constant stirring. The precipitated gel which had the composition, $3.3Na_2O.Al_2O_3.6SiO_2.100H_2O$ was heated to 90° C. in three hours with constant stirring. Heating and stirring were then stopped and the reaction mixture was left to stand for 18 hours. The temperature during this time fell to about 75° C. The reaction mixture was decanted with water several times, and the crystal paste was separated from the mother liquor through a filter press and washed out on the press (3 hours). After the product had been blown out to be dried, it was finally dried at 100° C. in a well ventilated oven.

Properties—Adsorption capacities:
for $H_2O$ (25° C., 10 mm. Hg)—32.5 g./100 g.
for $n-C_4H_{10}$ (25° C., 760 mm. Hg)—17.6 g./100 g.
Quantitative analysis: 3.29 $SiO_2/Al_2O_3$=faujasite-3.29
X-ray analysis: pure zeolite of faujasite type with $a_0$=24.822 A. (corresponding to
$$SiO_2/Al_2O_3=3.29)$$

What is claimed is:

1. Process for the preparation of zeolites which have the crystal structure of faujasite and a composition of the formula:

$$Na_2O.Al_2O_3.(3.5\pm0.5)SiO_2.nH_2O$$

($n$=0 to 8) by hydrothermal crystallization of reaction mixtures which contain $Na_2O$, $Al_2O_3$, $SiO_2$ and $H_2O$ at temperatures of 20 to 120° C., characterised in that the composition of the reaction mixtures, expressed as molar ratios of the oxides, lies within the limits of $SiO_2/Al_2O_3$ ------------------------------ 4 to 7
$Na_2O/SiO_2$ ------------------------------- 0.4 to 0.7
$H_2O/Na_2O$ -------------------------------- 30 to 50 the $SiO_2$ being used in the form of active precipitated silicic acid filler with specific surfaces of the $SiO_2$ particles of between 150 and 250 m.²/g. (according to BET) and the $Al_2O_3$ being in the form of sodium aluminate.

2. Process according to claim 1, wherein the reaction mixture is stirred while it is being heated up and during the crystallization.

3. Process according to claim 1, wherein the hydrothermal crystallization is effected by steps comprising preparing an aqueous sodium aluminosilicate gel at the surrounding temperature and immediately thereafter stirring and heating to 75–100° C. and heating in said temperature range for 4–48 hours.

4. Process according to claim 3, wherein the reaction mixture is stirred while it is being heated up and during the crystallization.

References Cited
UNITED STATES PATENTS

| 3,130,007 | 4/1964 | Breck | 23—113 |
| 3,343,913 | 9/1967 | Bobson | 23—113 |
| 2,940,830 | 6/1960 | Thornhill | 23—182 |
| 3,310,373 | 3/1967 | Johnson | 23—112 |
| 3,058,805 | 10/1962 | Weber | 23—113 |

EDWARD J. MEROS, Primary Examiner

U.S. Cl. X.R.
423—339